(12) United States Patent
Smith et al.

(10) Patent No.: US 10,581,684 B2
(45) Date of Patent: Mar. 3, 2020

(54) NETWORK MANAGEMENT VIA A SECONDARY COMMUNICATION CHANNEL IN A SOFTWARE DEFINED NETWORK

(71) Applicant: Schweitzer Engineering Laboratories, Inc., Pullman, WA (US)

(72) Inventors: Rhett Smith, Odessa, FL (US); Dennis Gammel, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 338 days.

(21) Appl. No.: 15/833,468

(22) Filed: Dec. 6, 2017

(65) Prior Publication Data

US 2019/0173754 A1 Jun. 6, 2019

(51) Int. Cl.
*G06F 15/173* (2006.01)
*H04L 12/24* (2006.01)
(Continued)

(52) U.S. Cl.
CPC ...... *H04L 41/0843* (2013.01); *H04L 41/0836* (2013.01); *H04L 45/38* (2013.01);
(Continued)

(58) Field of Classification Search
USPC ....... 709/203, 206, 217, 219, 223, 224, 226, 709/228, 230, 232, 238; 398/34
See application file for complete search history.

(56) References Cited

U.S. PATENT DOCUMENTS 7,710,999 B2 5/2010 Bolder
8,824,274 B1 9/2014 Medved
(Continued)

FOREIGN PATENT DOCUMENTS

CN 203376828 1/2014
CN 106301952 1/2017
(Continued)

OTHER PUBLICATIONS

Ferrus, et al., "SDN/NFV-enabled satellite communications networks: Opportunities, scenarios and challenges." In: Physical Communication. Mar. 2016 (Mar. 2016).
(Continued)

*Primary Examiner* — Quang N Nguyen
(74) *Attorney, Agent, or Firm* — Justin K. Flanagan

(57) ABSTRACT

A software-defined network controller (SDN controller) defines a first network flow to be selectively implemented by a networking device according to a first network operation profile. The SDN controller defines a second network flow to be selectively implemented by the networking device according to a second network operation profile. The first and second network operation profiles are stored within a memory of the networking device to be selectively implemented based on the status of a profile selection input on the networking device. The profile selection input is a contact input in some embodiments. When the contact input is de-asserted, the networking device implements the first network flow according to the first network operation profile. When the contact input is asserted, the networking device implements the second network flow according to the second network operation profile.

18 Claims, 11 Drawing Sheets

(51) Int. Cl.
*H04L 12/715* (2013.01)
*H04L 12/721* (2013.01)
*H04L 12/851* (2013.01)

(52) U.S. Cl.
CPC .............. *H04L 45/64* (2013.01); *H04L 45/66* (2013.01); *H04L 47/24* (2013.01)

(56) References Cited

U.S. PATENT DOCUMENTS

| | | | |
|---|---|---|---|
| 9,047,143 | B2 | 6/2015 | Pruss et al. |
| 9,124,485 | B2 | 9/2015 | Heron et al. |
| 9,137,140 | B2 | 9/2015 | Tao et al. |
| 9,258,212 | B2 | 2/2016 | Pfeifer et al. |
| 9,258,315 | B2 | 2/2016 | Martin |
| 9,270,754 | B2 | 2/2016 | Iyengar et al. |
| 9,276,827 | B2 | 3/2016 | Voit et al. |
| 9,282,164 | B2 | 3/2016 | Finn et al. |
| 9,330,156 | B2 | 5/2016 | Satapathy |
| 9,356,871 | B2 | 5/2016 | Medved et al. |
| 9,392,050 | B2 | 7/2016 | Voit et al. |
| 9,467,536 | B1 | 10/2016 | Kanekar et al. |
| 9,503,363 | B2 | 11/2016 | Sivabalan et al. |
| 9,596,141 | B2 | 3/2017 | McDowall |
| 10,142,372 | B2 | 11/2018 | Rogers |
| 10,313,238 | B2 | 6/2019 | Hayashi |
| 10,313,375 | B2 | 6/2019 | Lin |
| 2002/0144156 | A1 | 10/2002 | Copeland |
| 2007/0280239 | A1 | 12/2007 | Lund |
| 2008/0095059 | A1 | 4/2008 | Chu |
| 2010/0097945 | A1 | 4/2010 | Raftelis |
| 2010/0324845 | A1 | 12/2010 | Spanier |
| 2012/0300615 | A1 | 11/2012 | Kempf |
| 2012/0300859 | A1 | 11/2012 | Chapman |
| 2012/0331534 | A1 | 12/2012 | Smith |
| 2013/0121400 | A1 | 5/2013 | Eliezer |
| 2013/0163475 | A1 | 6/2013 | Beliveau |
| 2013/0311675 | A1 | 11/2013 | Kancherla |
| 2014/0003422 | A1 | 1/2014 | Mogul |
| 2014/0095685 | A1 | 4/2014 | Cvijetic et al. |
| 2014/0109182 | A1 | 4/2014 | Smith et al. |
| 2014/0280893 | A1 | 9/2014 | Pfeifer et al. |
| 2014/0317248 | A1 | 10/2014 | Holness et al. |
| 2014/0317256 | A1 | 10/2014 | Jiang et al. |
| 2014/0317293 | A1 | 10/2014 | Shatzkamer |
| 2014/0330944 | A1 | 11/2014 | Dabbiere et al. |
| 2014/0365634 | A1 | 12/2014 | Metz et al. |
| 2015/0281036 | A1 | 10/2015 | Sun et al. |
| 2015/0365189 | A1* | 12/2015 | Prakash .............. H04J 14/0227 398/34 |
| 2016/0014819 | A1 | 1/2016 | Cona |
| 2016/0050132 | A1 | 2/2016 | Zhang |
| 2016/0112269 | A1 | 4/2016 | Singh et al. |
| 2016/0139939 | A1 | 5/2016 | Bosch et al. |
| 2016/0142427 | A1 | 5/2016 | de los Reyes et al. |
| 2016/0234234 | A1 | 8/2016 | McGrew et al. |
| 2016/0269432 | A1 | 9/2016 | Lin |
| 2017/0019417 | A1 | 1/2017 | McGrew et al. |
| 2017/0026349 | A1 | 1/2017 | Smith et al. |
| 2017/0031704 | A1* | 2/2017 | Sudhakaran ........ G06F 9/45558 |
| 2017/0054626 | A1 | 2/2017 | Sivabalan et al. |
| 2017/0070416 | A1 | 3/2017 | Narayanan et al. |
| 2017/0222918 | A1 | 8/2017 | Sebastian |
| 2017/0302539 | A1* | 10/2017 | Park .................... H04L 41/5016 |
| 2017/0359383 | A1 | 12/2017 | Rogers |
| 2018/0176090 | A1 | 6/2018 | Lessmann |
| 2018/0241621 | A1 | 8/2018 | Vaishnavi |
| 2018/0287725 | A1 | 10/2018 | Rabinovich |
| 2018/0287859 | A1 | 10/2018 | Desigowda |
| 2019/0014139 | A1 | 1/2019 | Wang |
| 2019/0020542 | A1* | 1/2019 | Kaag ...................... H04L 12/10 |
| 2019/0052533 | A1* | 2/2019 | Rao ........................ H04L 41/12 |
| 2019/0342158 | A1* | 11/2019 | Wan ...................... H04L 41/085 |
| 2019/0342175 | A1* | 11/2019 | Wan ........................ H04L 67/10 |

FOREIGN PATENT DOCUMENTS

| | | |
|---|---|---|
| EP | 3109128 | 12/2016 |
| WO | 2016206741 | 12/2016 |
| WO | 2017067578 | 4/2017 |

OTHER PUBLICATIONS

Gember et al., "Toward Software-Defined Middlebox Networking" In: Proceedings of the 11th ACM Workshop on Hot Topics in Networks. Oct. 30, 2012.

Mizrahi et al., Time-based Updates in OpenFlow: A Proposed Extension to the OpenFlow Protocol, Jul. 7, 2013, CCIT Report #835, Jul. 2013, EE Pub No. 1792, Technion, Israel (Year: 2013).

* cited by examiner

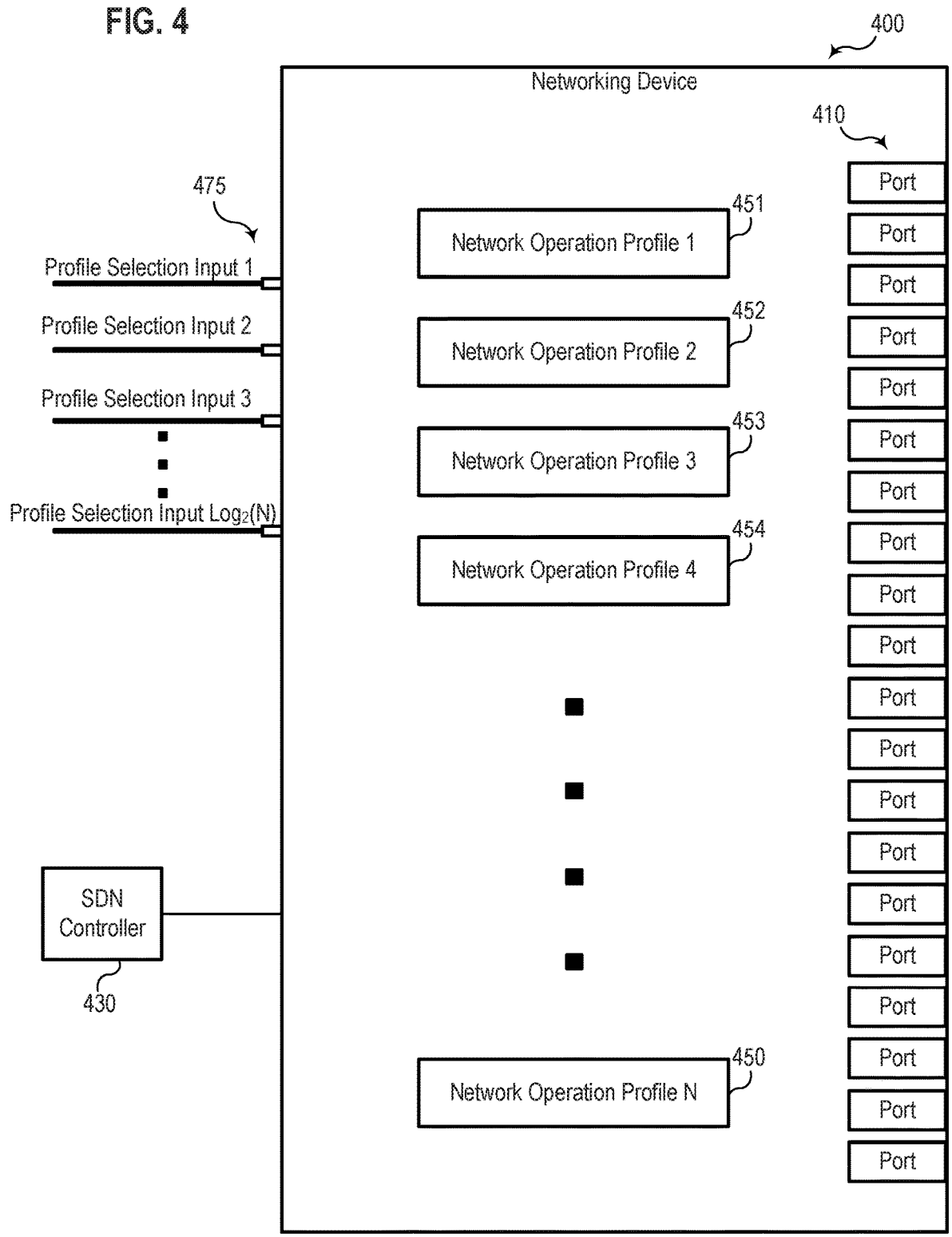

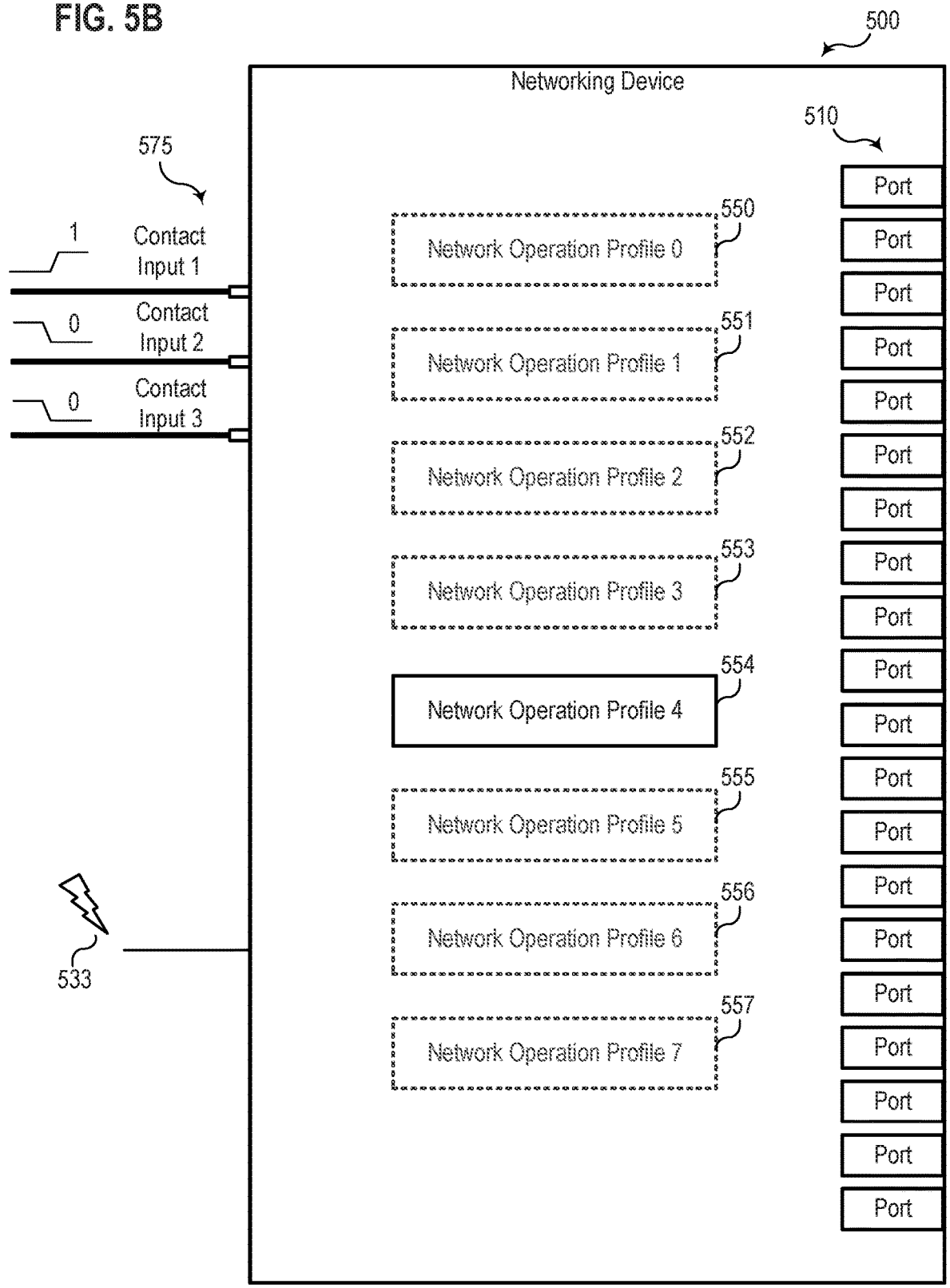

US 10,581,684 B2

NETWORK MANAGEMENT VIA A SECONDARY COMMUNICATION CHANNEL IN A SOFTWARE DEFINED NETWORK

TECHNICAL FIELD

This disclosure relates to software-defined networks. More particularly, this disclosure relates to switching between predefined network traffic flow profiles based on a profile selection input on a networking device.

BRIEF DESCRIPTION OF THE DRAWINGS

The written disclosure herein describes illustrative embodiments that are nonlimiting and non-exhaustive. Reference is made to certain of such illustrative embodiments that are depicted in the figures described below.

FIG. 4 illustrates a networking device with a plurality of network operation profiles selectable via profile selection inputs.

FIG. 5B illustrates the networking device with a different network operation profile selected by asserting a different combination of the binary-addressable contact inputs.

DETAILED DESCRIPTION

Figure 1:
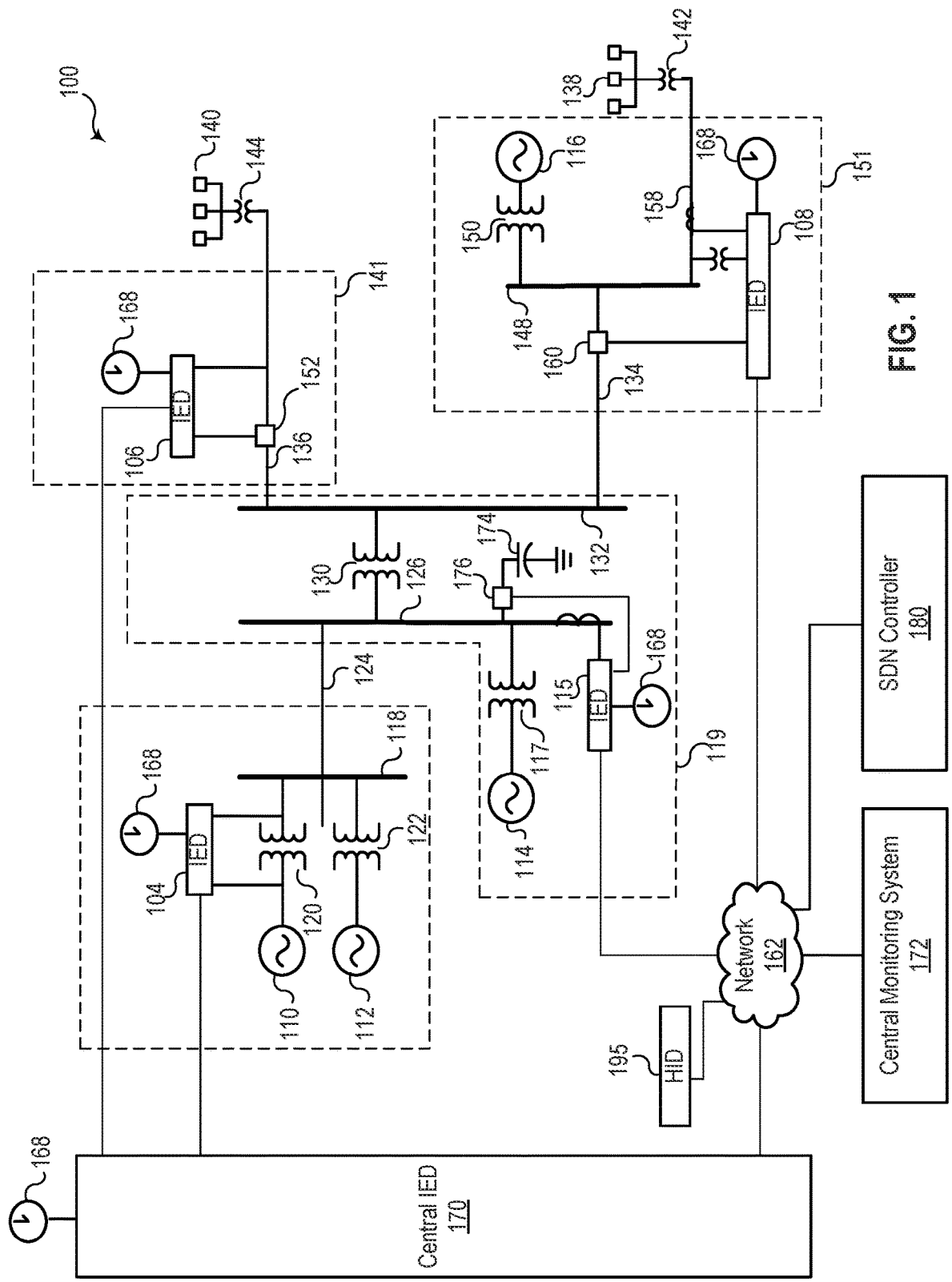
FIG. 1 illustrates an example of a simplified one-line diagram of an electric power transmission and distribution system in which various communication devices communicate via a software-defined network (SDN).

Electric power distribution and transmission systems include various monitoring and protection devices. Various protection and monitoring functions within an electric power distribution or transmission system may be enabled through the use of a wide variety of communication and networking technologies. Communication and networking devices may, among other things, facilitate an exchange of information, transmission of control instructions, and enable data acquisition. Some communication within an electric power distribution or transmission may be time-sensitive. For example, protective actions may be life or equipment saving if implemented quickly.

Critical infrastructure of an electric power distribution and transmission system is protected to prevent physical and electronic intrusion. For example, electric power systems (and the control, monitoring, and protective devices therein) may be subjected to cyber attacks. Some systems may incorporate software-defined network (SDN) technologies to regulate communications on a network interconnecting data stores, control devices, monitoring devices, protective devices, human interfaces, and/or other electronic equipment. A wide variety of data security and network control options are available using SDNs, including, without limitation, deny-by-default security, latency guarantees, deterministic transport capabilities, failover planning, fault tolerance, path reliability analysis, etc.

A network engineer or other information technology (IT) technician may use an SDN flow controller (e.g., a software application running on a general-purpose computer) to program a networking device. Examples of networking devices applicable to the systems and methods described herein include, but are not limited to: switches, hubs, repeaters, gateways, routers, network bridges, modems, wireless access points, and line drivers. As used herein the term "networking device" may, as the context allows, also encompass a wide variety of hybrid networking devices such as multilayer switches, protocol converts, terminal adapters, bridge routers, proxy servers, firewall devices, network address translators, multiplexers, network interface controllers, and the like. Thus, while many of the principles of the systems and methods are described herein using a network switch as an example, it is appreciated that such principles may be adapted for use with many other networking device types.

In some embodiments, a network engineer uses an SDN controller, or SDN flow controller, to dynamically program one or more networking devices. A network engineer may utilize an SDN controller to define a network operation profile to be implemented by each connected networking device. A network operation profile may, among other things, define which data types are allowed on a network, the routing of the data between various devices on a network, prioritization of certain devices and/or data types, which devices are allowed to communicate on the network, which devices are allowed to communicate with which other devices, etc.

As described above, a network engineer can use an SDN controller to program the networking device with a specific network operation profile. Once programmed, the networking device can continue to implement the defined network operation profile even if the SDN controller is offline or disconnected. When changes are needed or desired, the network engineer can use the SDN controller to modify the network operation profile or define a new network operation profile for the networking device. In some embodiments, the network engineer can use the SDN controller to modify the network operation profile in real time without disrupting data flow on the network. While such programming may be considered part of IT management, for operational technology (OT) success, the network operation profile may further define how one or more networking devices should behave or respond to various operational and/or failure conditions.

In defining a network operation profile, a balance is typically struck between security, accessibility, and/or usability. For example, a network switch may be programmed with a network operation profile that prohibits Telnet communications from a physical access controller, such a human interface device (HID), to a relay of a power distribution system. Disabling Telnet communications to the relay may increase security, but also prevent easy access to the relay by an authorized operator. Per the embodiments described above, a network engineer may temporarily modify the network operation profile of the network switch during a time period when the authorized operator will be interacting with the relay via Telnet communications.

That is, Telnet communications may be manually enabled through the use of an SDN flow controller, such as a software application running on a general-purpose computer. Such a process may require multiple users, take a substantial amount of time, require reprogramming of one or more networking devices, and/or be otherwise cumbersome and susceptible to human error both in the reprogramming and in reverting back to the original programming when the authorized operator is finished.

Systems and methods are described below that relate to networking devices that allow for switching between two or more stored network operation profiles via a secondary communication channel (e.g., a contact input) on the networking device. The secondary communication channel can be aptly referred to as a profile selection input provided to a profile selection port on the networking device. For example, a network engineer may configure a network switch with two distinct network operation profiles. The two distinct network operation profiles are stored in a memory of the networking device for selective implementation (e.g., execution).

A first network operation profile may prevent Telnet communications on the network and a second network operation profile may allow Telnet communications on the network. The network switch may profile selection port to receive an input (e.g., a contact input) that allows a user to select between the first network operation profile and the second network operation profile. In some embodiments, the profile selection input (i.e., secondary channel) may be a single bit channel that can be asserted or de-asserted. In other embodiments, the profile selection port on a networking device may be multi-bit but low bandwidth. In still other embodiments, the profile selection port on a networking device may be a high bandwidth, multi-bit communication channel.

As an example, a profile selection communication channel may be a direct input channel or a point-to-point contact input channel that is physically secured. Returning to the example above, the authorized operator may enter a physically secure area to access a physical access controller (e.g., an HID) to send Telnet communications to a relay. With the network switch executing the first network operation profile, Telnet communications may be prohibited. However, by toggling a contact input directly connected to profile selection input(s) on one or more network switches on the SDN, the authorized operator may transition the one or more network switches to the second network operation profile that allows Telnet communications. Such a transition may occur without any disruption to other network traffic. Once the authorized operator has concluded his work with the relay via Telnet communications, the contact input may be used to toggle the one or more network switches back to the first network operation profile.

In some embodiments, the networking device may be configured to revert to the first network operation profile after a predefined time period or a defined period of inactivity on the physical access controller. For example, the contact input may be asserted until a physical or electronic timer expires, after which the contact input is automatically de-asserted. Such a contact input may be, for example, connected to a spring-wound auto-off timer.

Thus, a networking device may include a single contact input that allows for selection between two stored network operation profiles (e.g., two network operation profiles that were previously defined and stored via an SND flow controller). In some embodiments, multiple contact inputs may be used to select between any number of network operation profiles stored within a networking device. For example, multiple contact inputs may be used to select between multiple operational profiles based on a binary count of asserted and de-asserted states of the contact inputs.

Such a networking device could also be programmed to utilize a single network operation profile regardless of the state of a contact input and/or only respond to the contact input during specific time periods. For example, the networking device may only be toggled between network operational profiles via a contact input during regular business hours or only during expected maintenance windows.

A network engineer programming a networking device may define network flows that are executed or implemented (i) regardless of the state of the contact input, (ii) only when the contact input is asserted, or (iii) only when the contact input is de-asserted. Accordingly, a network engineer may define network operation profiles for a networking device to allow for network flows that are different depending on the state of the contact input. Specifically, some network flows may be active all of the time, regardless of the state of the contact input. Some network flows may be active only when the contact input is asserted. Other network flows may be active only when the contact input is de-asserted. In embodiments in which multiple contact inputs are available on the networking device, each network flow may be defined with respect to the one or more contact inputs and/or combinations thereof.

In still other embodiments, the secondary communication channel (e.g., a contact input) may be actuated to switch between stored network operation profiles. That is, rather than associating an asserted state with a first profile and a de-asserted state with a second profile, each time the secondary channel is asserted a "next" network operation profile may be utilized. For example, the secondary communication channel may be connected to a button. Each time the button is pressed, the networking device may begin using the "next" network operation profile in a sequence of stored network operation profiles. If the networking device includes only two network operation profiles, then the button may be used to alternate between the two network operation profiles.

As described above, the use of one or more contact inputs on a networking device allows for switching between two or more modes of network operations, where each mode of operations can be defined by a network operation profile. A network operation profile may define any of a wide variety of network elements. For example, a network operation profile may define the port forwarding configurations, device privileges, user privileges, load balancing, network address translation handling, traffic routing, traffic prioritization, packet size, allowed protocols, virtual local area network changes, redundancy routing, port mirroring, traffic segmentation, data logging configurations, quality of service settings, selective virtual local area network configurations, port trunking, port access control lists (PACLs), virtual access control lists (VACLs), ring topologies, and other networking device settings.

There are too many permutations and combinations of networking device settings to exhaustively list them all, especially when considering that a single contact input may be connected to multiple networking devices that each have a plurality of distinct network operation profiles. Accordingly, this disclosure includes a few examples with the understanding that many more combinations are possible. Moreover, the variations in network operation profiles may also vary significantly based on the type of networking device being configured. For example, a network operation profile for a managed switch may not include DHCP settings, while a network operation profile for a router might. Similarly, a network operation profile for a firewall or edge router device might include different network operation profile settings than a repeater would.

The specific settings applicable to a network operation profile depend largely on the type of networking device being configured and will be appreciated by one of skill in the art. Regardless of the available and applicable configuration settings, the systems and methods described herein modify the functionality of such devices by allowing them to store two or more network operation profiles that can be selectively implemented based on a profile selection signal provided to a profile selection port of the networking device.

As one example, with a contact switch de-asserted, a first network operations profile may be configured to prevent certain communication protocols, limit communication between certain devices, and have a defined port forwarding table. When the contact switch is asserted, a second network operations profile may be utilized and the network switch may create two virtual local area networks (VLANs), allow some previously disabled communication protocols, and/or allow for communication between two devices that was previously prevented.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

As used herein, the term "IED" may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term "IED" may be used interchangeably to describe an individual IED or a system comprising multiple IEDs.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like.

The processor may include a special purpose processing device, such as an ASIC, PAL, PLA, PLD, Field Programmable Gate Array, or other customized or programmable device. The computer may also include a computer-readable storage device, such as non-volatile memory, static RAM, dynamic RAM, ROM, CD-ROM, disk, tape, magnetic, optical, flash memory, or another computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism.

Aspects of certain embodiments described herein may be implemented as software modules or components. As used herein, a software module or component may include any type of computer instruction or computer-executable code located within or on a computer-readable storage medium. A software module may, for instance, comprise one or more physical or logical blocks of computer instructions, which may be organized as a routine, program, object, component, data structure, etc. that perform one or more tasks or implement particular abstract data types.

A particular software module may comprise disparate instructions stored in different locations of a computer-readable storage medium, which together implement the described functionality of the module. Indeed, a module may comprise a single instruction or many instructions and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In other instances, well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

FIG. 1 illustrates an embodiment of a simplified one-line diagram of an electric power transmission and distribution system 100 in which a plurality of communication devices facilitate communication in a software-defined network (SDN) consistent with embodiments of the present disclosure. The electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, and 158), circuit breakers (e.g., breakers 152, 160, 176), busses (e.g., busses 118, 126, 132, and 148), loads (e.g., loads 140, and 138) and the like. A variety of other types of equipment may also be included in the electric power delivery system 100, such as voltage regulators, capacitor banks, and a variety of other types of equipment.

A substation 119 may include a generator 114, which may be a distributed generator, and which may be connected to the bus 126 through a step-up transformer 117. The bus 126 may be connected to a distribution bus 132 via a step-down transformer 130. Various distribution lines 136 and 134 may be connected to the distribution bus 132. The distribution line 136 may lead to a substation 141 and the line may be monitored and/or controlled using an IED 106, which may selectively open and close a breaker 152. A load 140 may be fed from the distribution line 136. A step-down transformer 144 in communication with the distribution bus 132 via the distribution line 136 may be used to step down a voltage for consumption by the load 140.

The distribution line 134 may lead to a substation 151, and deliver electric power to the bus 148. The bus 148 may also receive electric power from the distributed generator 116 via a transformer 150. The distribution line 158 may deliver electric power from the bus 148 to the load 138 and may include another step-down transformer 142. The circuit breaker 160 may be used to selectively connect the bus 148 to the distribution line 134. The IED 108 may be used to monitor and/or control the circuit breaker 160 as well as the distribution line 158.

The electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal may be distributed throughout system 100. Utilizing a common or universal time source may ensure that IEDs have a synchronized time signal that can be used to generate time synchronized data, such as synchrophasors. In various embodiments, IEDs 104, 106, 108, 115, and 170 may receive a common time signal 168. The time signal may be distributed in system 100 using a communications network 162 or using a common time source, such as a Global Navigation Satellite System ("GNSS"), or the like.

According to various embodiments, the central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170 and may communicate over various media such as a direct communication from IED 106 or over a wide-area communications network 162, such as via a virtual private network (VPN). According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via the network 162 may be facilitated by networking devices including, but not limited to, multiplexers, routers, hubs, gateways, firewalls, and switches. In some embodiments, IEDs and networking devices may comprise physically distinct devices. In other embodiments, IEDs and networking devices may be composite devices or may be configured in a variety of ways to perform overlapping functions. IEDs and networking devices may comprise multi-function hardware (e.g., processors, computer-readable storage media, communications interfaces, etc.) that can be utilized to perform a variety of tasks that pertain to network communications and/or the operation of equipment within system 100. Thus, the terms networking device and IED may be used interchangeably in some instances to the extent that the IED is interacting with a network (e.g., an SDN) and/or to the extent that a networking device is performing a function of an IED as described herein.

An SDN controller 180 may be configured to interface with equipment in the network 162 to create an SDN that facilitates communication between IEDs 170, 115, 108, and monitoring system 172. In various embodiments, the SDN controller 180 may be configured to interface with a control plane (not shown) in the network 162. The SDN controller may be used to define (e.g., program) network operation profiles of one or more networking devices and/or IEDs connected to the network 162. In some embodiments, a human interface device (HID) 195 may have selective or limited access on the network 162. Access to the network 162 by the HID 195 may be limited according to some network operation profiles and expanded according to other network operation profiles.

Figure 2A:
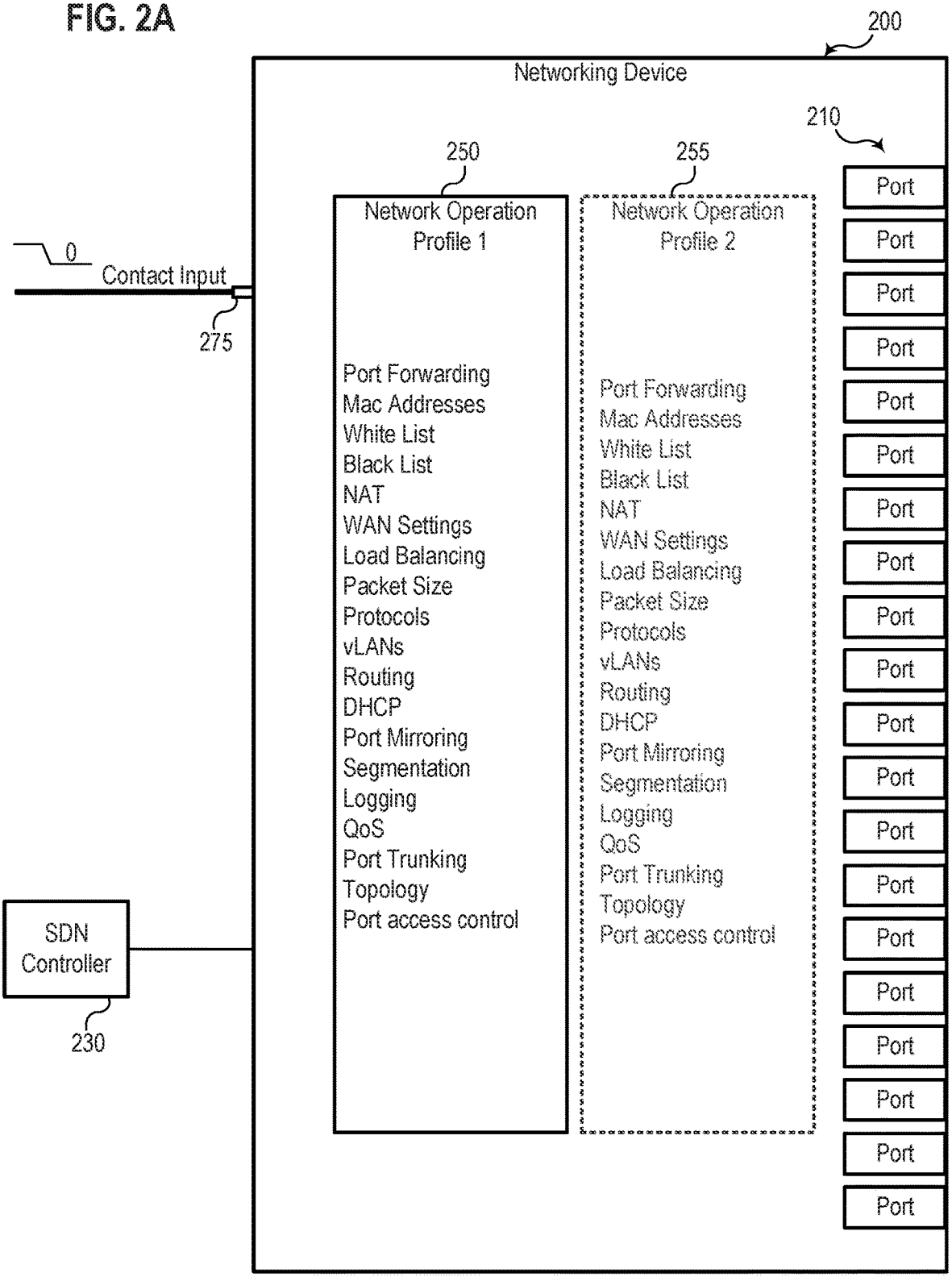
FIG. 2A illustrates a networking device with two network operation profiles defined by an SDN controller that are selectable via a contact input.

FIG. 2A illustrates a networking device 200 with two network operation profiles 250 and 255 defined by an SDN controller 230 that are selectable via a contact input 275. As illustrated, the networking device may include any number of network communication ports 210. In some embodiments, the SDN controller 230 is connected via one of the network communication ports 210. A network engineer or other user may define a first network operation profile 250 to implement a first network flow.

The first network operation profile 250 may set forth any number of network settings and/or functionalities, including but not limited to: port forwarding configurations, device privileges, user privileges, load balancing, network address translation handling, traffic routing, traffic prioritization, packet size, allowed protocols, virtual local area network changes, redundancy routing, port mirroring, traffic segmentation, data logging configurations, quality of service settings, selective virtual local area network configurations, port trunking, port access control lists (PACLs), virtual access control lists (VACLs), ring topologies, and other networking device settings.

Figure 2B:
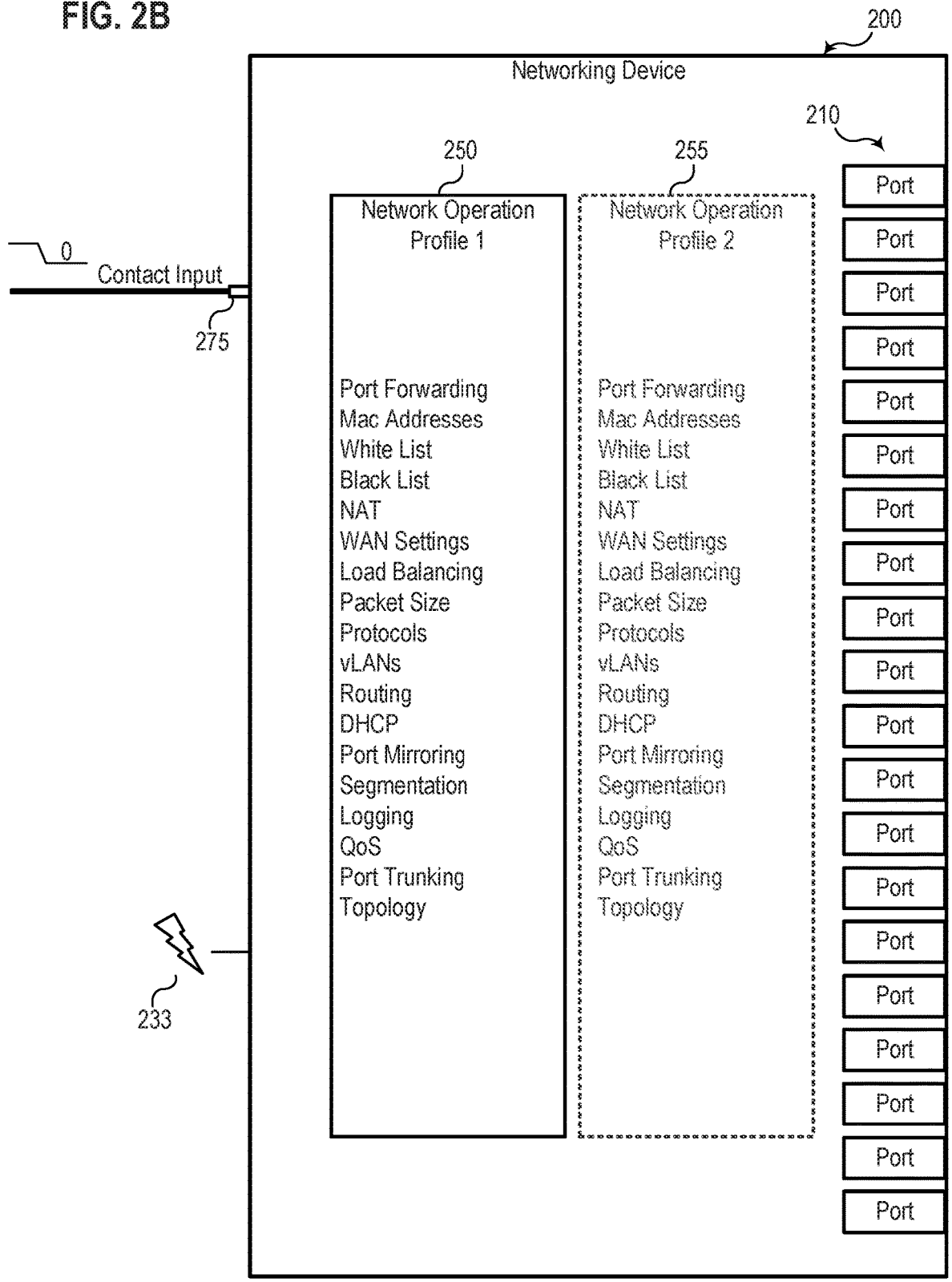
FIG. 2B illustrates the networking device with the two network operation profiles stored for selection via the contact input with the SDN controller disconnected.

The SDN controller 230 may be used to define a second network operation profile 255 with a different combination of settings to effectuate an alternative, second network flow. The contact input 275 may be de-asserted to select the first network operation profile (as illustrated) and may be asserted to select the second network operation profile. The contact input 275 may, in some embodiments, be implemented as serial or parallel port instead FIG. 2B illustrates the networking device 200 with the two network operation profiles 250 and 255 stored for selection via the contact input 275, even with the SDN controller disconnected, at 233. Accordingly, changes to the network operation profile (and associated network flow) can be made by selecting different network operation profiles via the contact input 275, even when the SDN controller is disconnected, at 233, and/or without using a connected SDN controller.

Figure 2C:
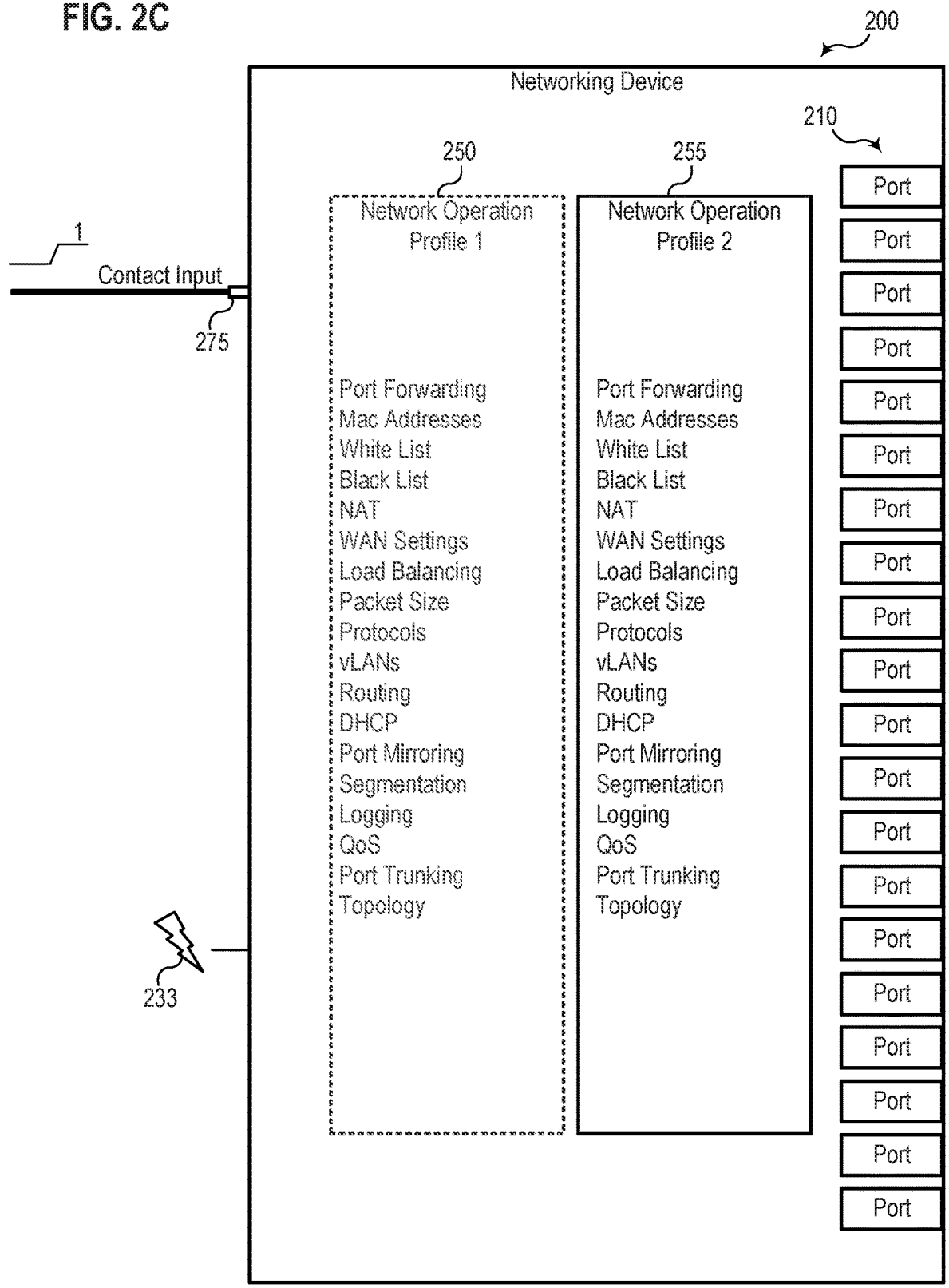
FIG. 2C illustrates the networking device with the second network operation profile selected by asserting a contact input.

FIG. 2C illustrates the networking device 200 with the second network operation profile 255 selected by asserting a contact input 275. In some embodiments, the second network operation profile 255 may re-define one or more (or all) of the various network settings for the particular networking device. In other embodiments, the second network operation profile may only define changes relative to the first network operation profile. In still other embodiments, each of the first and second network operation profiles 250 and 255 may define changes relative to a default or base network operation profile of the networking device.

Figure 2D:
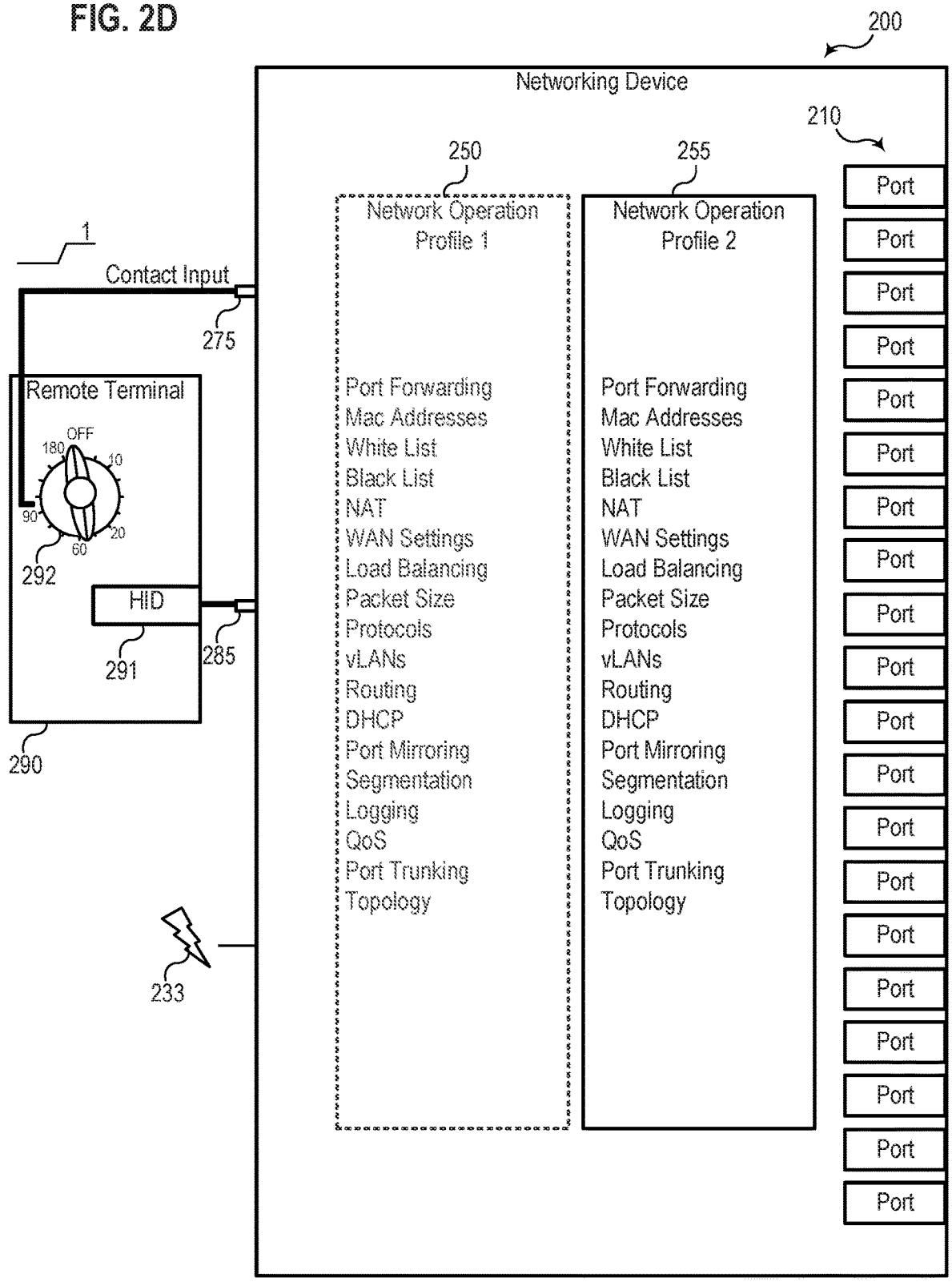
FIG. 2D illustrates an example of the networking device with a contact input connected to a timer in a remote location.

FIG. 2D illustrates the networking device 200 connected to a timer device 292 in remote terminal 290. The remote terminal also includes an HID 291 connected to a port of the networking device 285. In various embodiments, the first network operation profile 250 may prevent or block communication from the HID 291 in the remote location 290 unless the contact input 275 is asserted. Accordingly, an operator may enter the remote location 290 and rotate the timer 292 to select a length of time for the contact input 275 to be asserted. When the time 292 expires, the contact input 275 is de-asserted and the networking device 200 will return to implementing the first network operation profile 250, at which point communication from the HID 291 is again prohibited.

Figure 3A:
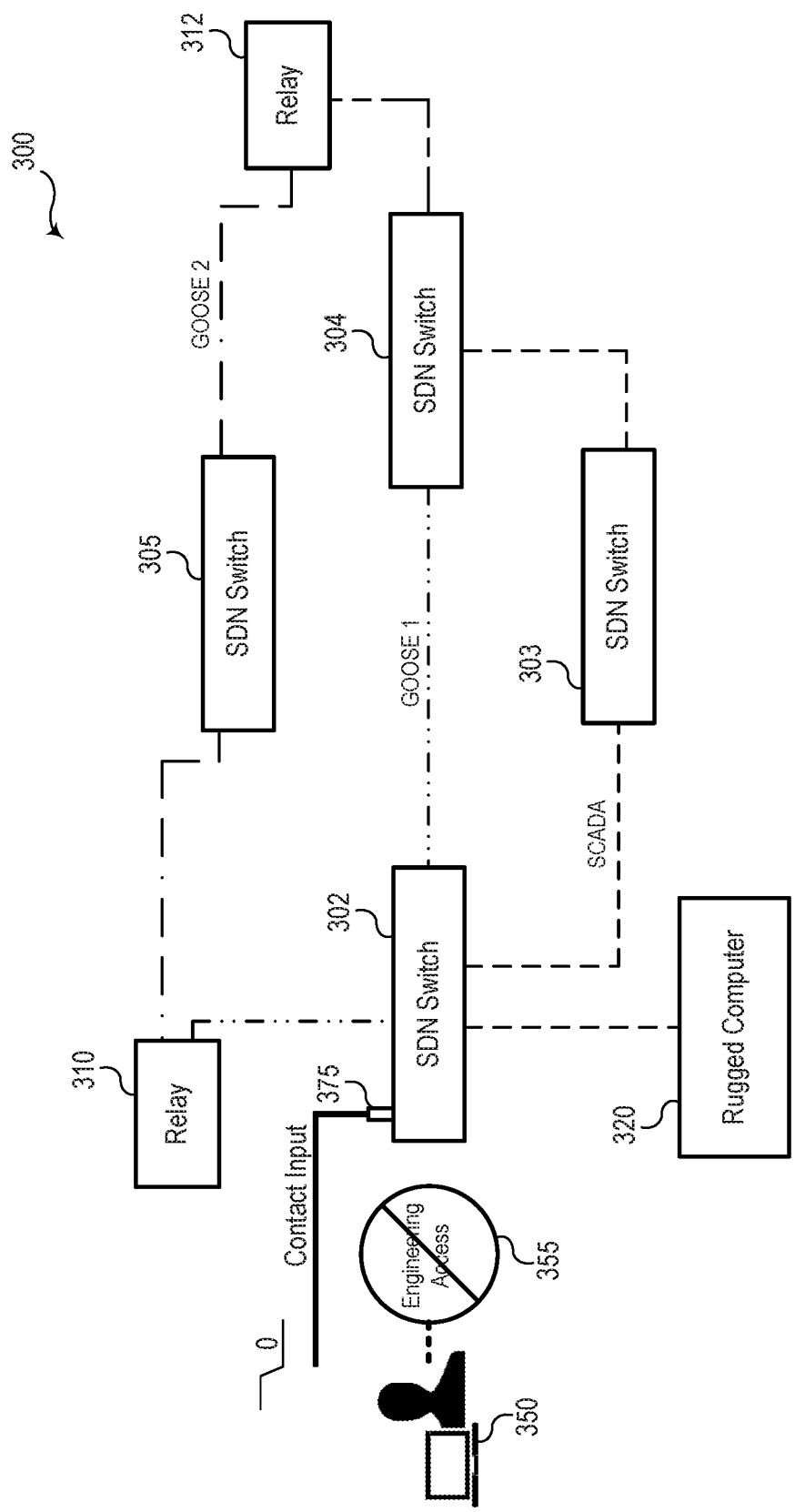
FIG. 3A illustrates an SDN with a plurality of networking devices, at least one of which is implementing a first network operation profile that disables engineering access via a human interface device (HID).

FIG. 3A illustrates an SDN 300 with a plurality of networking devices, at least one of which is implementing a first network operation profile that disables engineering access, at 355, via a human interface device (HID) 350. As illustrated, the SDN may include SDN switches 302, 303, 304, and 305. The SDN network may also include a rugged computer 320 and relays 310 and 312. Various communication protocols and communication paths may be utilized. For example, with the contact input 375 de-asserted, SDN switch 302 and/or SDN switches 303, 304, and 305 may implement a first network operation profile that allows for the illustrated network flows using GOOSE and SCADA protocols. However, the first network operation profile may not allow engineering access 355 and/or associated protocols.

Figure 3B:
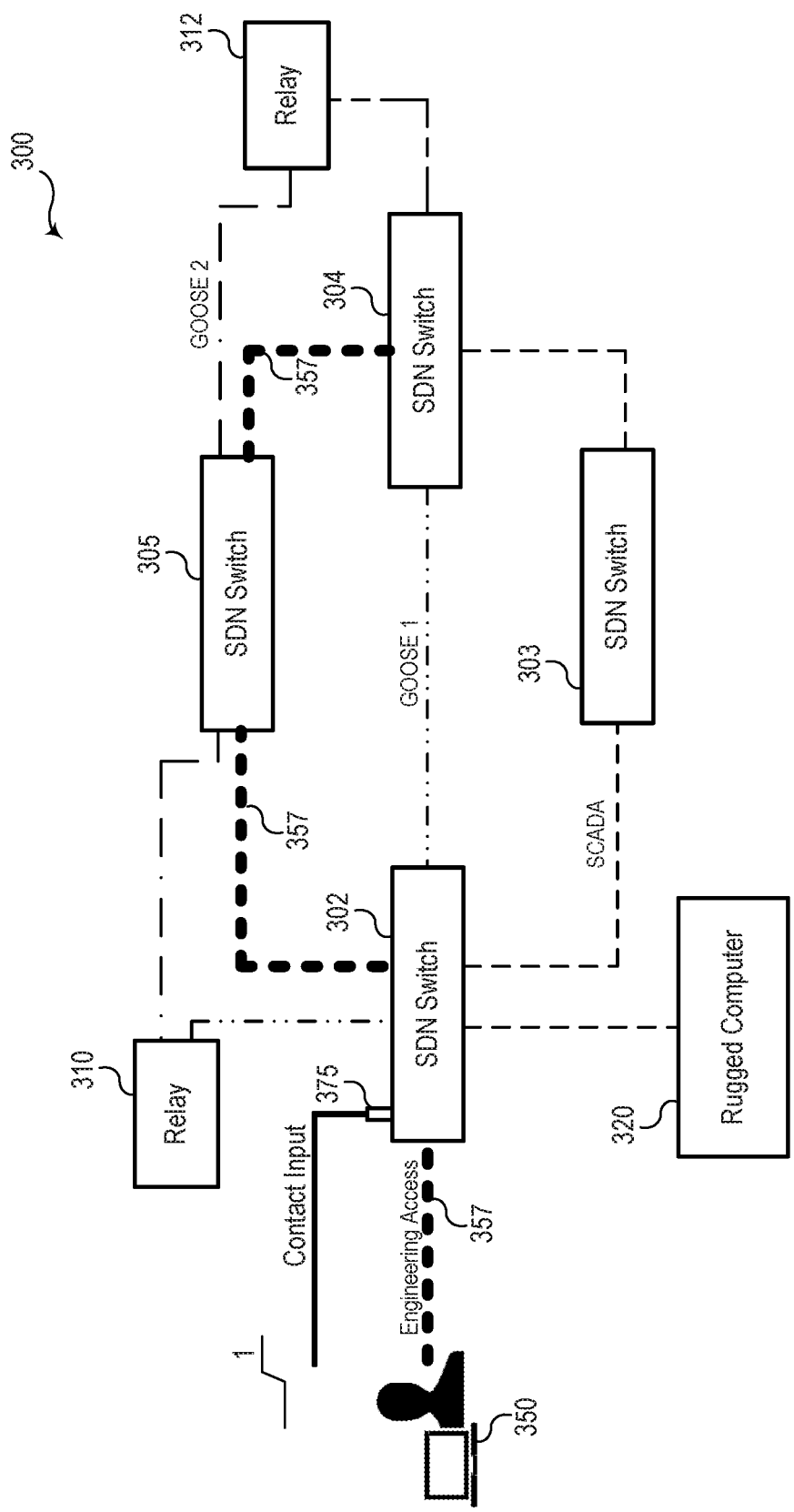
FIG. 3B illustrates the SDN with at least one of the networking devices implementing a second network operation profile based on the asserted contact input, where the second network operation profile enables engineering access.

FIG. 3B illustrates the SDN 300 with at least one of the networking devices (e.g., SDN switches 302, 303, 304, and 305) implementing a second network operation profile based on the asserted contact input 375. As illustrated, the second network operation profile allows engineering access 357 via HID 350. The engineering access 357, including various connections and associated protocols, is shown as a new network flow between HID 350, SDN switch 302, SDN switch 305, and SDN switch 304. In some embodiments, other network operation profiles may allow still other network flows between other devices and/or utilizing still other protocols.

FIG. 4 illustrates a networking device 400 with a plurality of communication ports 410. An SDN controller 430 can be used to define a plurality of network operation profiles 1-N (451, 452, 453, 454 . . . 450). A plurality of profile selection inputs (e.g., contact input ports, serial input ports, parallel input ports, or the like) may be used to select between the various network operation profiles. In some embodiments, each profile selection input 475 may be associated with unique network operation profile (450-454). In other embodiments, as illustrated, the plurality of profile selection inputs may be configured to provide, for example, a binary-addressable set of inputs for selecting a network operation profile (450-454). For N network operation profiles, $\text{Log}_2$(N) profile selection inputs can be used to selectively implement any of the N network operation profiles.

Figure 5A:
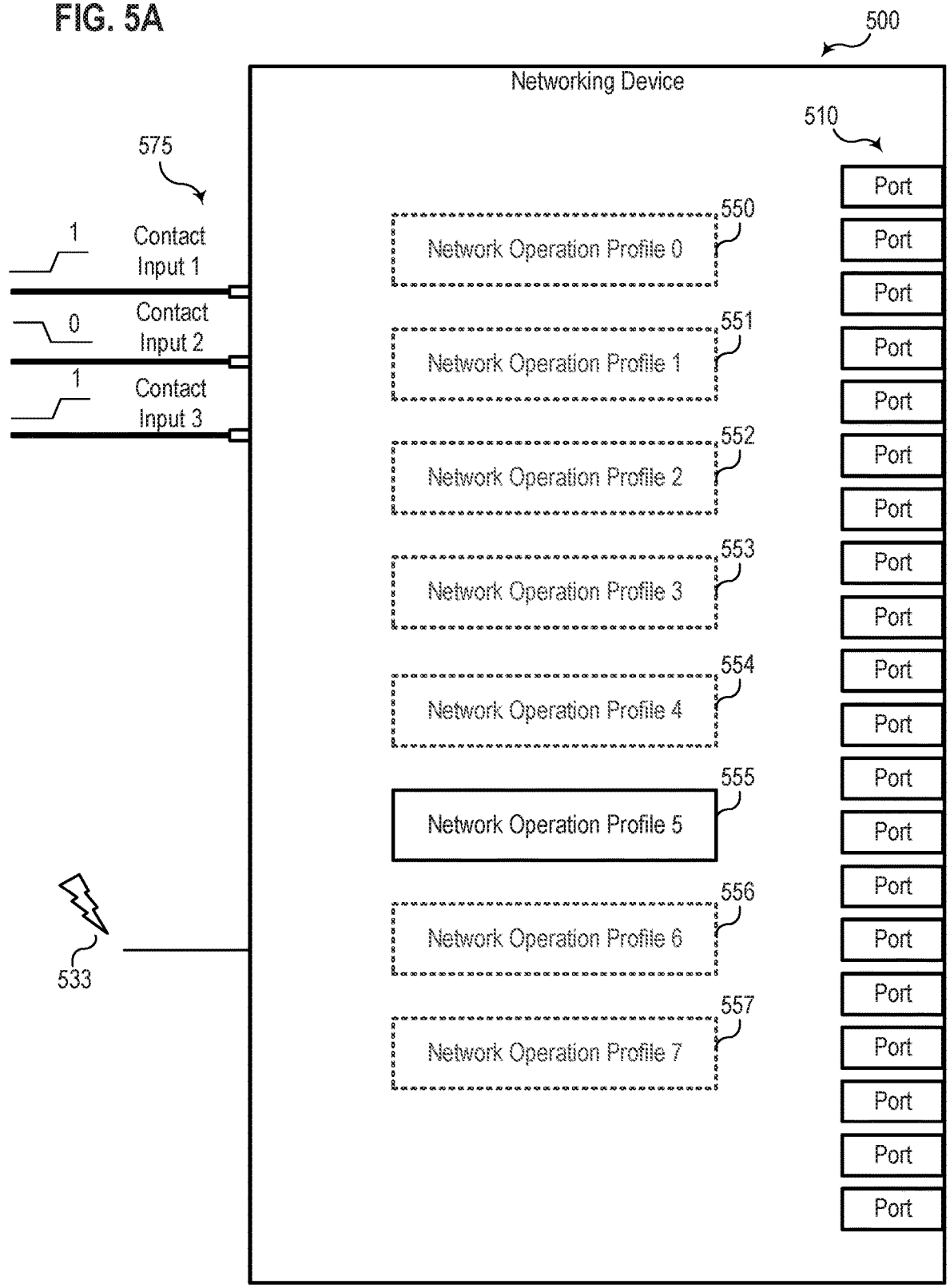
FIG. 5A illustrates a networking device with eight network operation profiles selectable via three binary-addressable contact inputs.

FIG. 5A illustrates a networking device 500 with eight network operation profiles (550-557) selectable via three binary-addressable contact inputs 575. As illustrated, no SDN controller 533 is connected to the networking device 500 to modify network flows (e.g., by modifying a network operation profile). Contact inputs 1, 2, and 3 (575) are set to "101" in binary corresponding to the network operation profile 555.

FIG. 5B illustrates the networking device 500 with network operation profile 554 selected by asserting binary-addressable contact inputs 1, 2, and 3 (575) as "100" in binary. As previously described, network operation profile 554 may provide for different network flows than the network operation profile 555.

Figure 6:
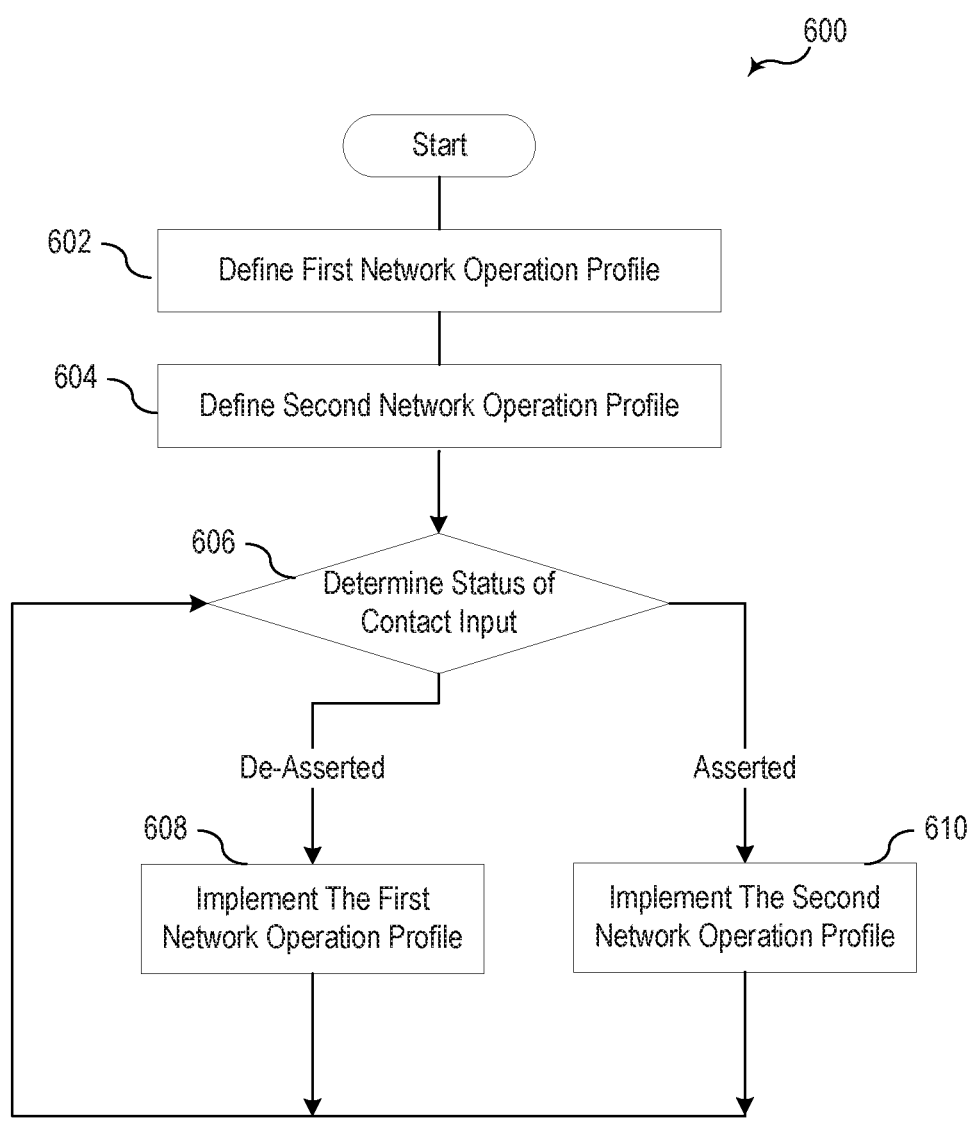
FIG. 6 illustrates a flowchart of an example of a method for selecting between two network flows associated with distinct network operation profiles selectable via a contact input.

FIG. 6 illustrates a flowchart of an example of a method 600 for selecting between two network flows associated with distinct network operation profiles selectable via a contact input. A first network operation profile is defined, at 602, via, for example, an SDN controller. The SDN controller may define, at 604, a second network operation profile. The networking device may intermittently, continually, or based on a change in status, determine the status of a contact input, at 606. If the contact input is de-asserted, the networking device may implement, at 608, the first network operation profile. If the contact input is asserted, the networking device may implement, at 610, the second network operation profile. If the status of the contact input changes, at 606, then the other network operation profile may be implemented.

The methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified and/or steps or actions may be omitted.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations. Thus, all feasible permutations and combinations of embodiments are contemplated.

Several aspects of the embodiments described may be implemented using hardware, firmware and/or software modules or components. As used herein, a module or component may include various hardware components, firmware code, and/or any type of computer instruction or computer-executable code located within a memory device and/or transmitted as transitory or nontransitory electronic signals over a system bus or wired or wireless network. Many of the embodiments described herein are shown in block diagram form and/or using logic symbols. It is appreciated that various elements of each of the illustrated and described embodiments could be implemented using FPGAs, custom application specific integrated circuits (ASICs), and/or as hardware/software combinations.

In the description above, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure also includes all permutations and combinations of the independent claims with their dependent claims.

What is claimed is:

1. A software-defined networking device, comprising:
   a processor;
   a plurality of communication ports for network communications;
   a non-transitory computer-readable medium to store a plurality of network operation profiles, wherein each of the plurality of network operation profiles is implementable by the processor to control network behavior via the plurality of communication ports;
   a profile selection port to receive a signal selecting one of the plurality of network operation profiles to be implemented by the networking device, wherein the profile selection port is a contact input that can be de-asserted to select a first of the plurality of network operation profiles and asserted to select a second of the plurality of network operation profiles; and
   a controller port to receive communications from a software-defined network (SDN) controller, wherein each of the plurality of network operation profiles is defined by the SDN controller.

2. The software-defined networking device of claim 1, wherein at least one of the network operation profiles is defined in terms of changes to another of the network operation profiles.

3. The software-defined networking device of claim 1, wherein a first network operation profile of the plurality of network operation profiles disables a first communication protocol via the plurality of communication ports, and wherein a second network operation profile of the plurality of network operation profiles enables the first communication protocol via the plurality of communication ports.

4. The software-defined networking device of claim 1, wherein the profile selection port comprises one of an ethernet port and a serial port.

5. The software-defined networking device of claim 1, wherein the plurality of communication ports includes one or more of: contact ports, a DB-25 port, an RS-485 port, an RS-232 port, an Ethernet port, an SFP port, a SONET port, a COM port, an EtherCAT port, a Fiber Channel port, a serial port, and a parallel port.

6. The software-defined networking device of claim 1, wherein each of the plurality of network operation profiles defines network behavior via the plurality of communication ports as it pertains to one or more of: port forwarding, MAC address handling, network address translation, protocol enablement and disablement, virtual local area network creation, routing, port access control, virtual private network management, and quality of service management.

7. A method of operating a software-defined network, comprising:
   defining, via a software-defined network controller (SDN controller), a first network flow to be implemented by at least one networking device connected as part of a software-defined network (SDN);
   defining, via the SDN controller, a second network flow to be implemented by the at least one networking device, wherein the second network flow is different than the first network flow;
   determining a status of a profile selection signal received by the at least one networking device as one of de-asserted and asserted;
   implementing, by the at least one networking device, the first network flow in response to a determination that the status of the profile selection signal is de-asserted; and
   implementing, by the at least one networking device, the second network flow in response to a determination that the status of the profile selection signal is asserted.

8. The method of claim 7, further comprising:
   disconnecting the SDN controller from the at least one networking device before implementing the second network flow in response to the determination that the status of the profile selection signal is asserted.

9. The method of claim 7, wherein implementing the second network flow enables communication between two devices that was previously prevented per the first network flow.

10. The method of claim 7, wherein implementing the second network flow enables a communication protocol on the SDN that was previously disabled per the first network flow.

11. The method of claim 7, wherein the second network flow is defined in terms of change to the first network flow.

12. The method of claim 7, wherein the first network flow is defined, at least in part, based on a first network operation profile, and
   wherein the second network flow is defined, at least in part, based on a second network operation profile.

13. The method of claim 12, wherein the at least one networking device connected as part of the SDN is configured to store the first and second network operation profiles.

14. The method of claim 13, wherein implementing the second network flow comprises executed the stored second network operation profile to the exclusion of the first stored network operation profile.

15. A software-defined network, comprising:
a networking device that facilitates communication between intelligent electronic devices (IEDs) in a software-defined network (SDN);
at least one SDN controller to:
define a first network operation profile to be implemented by default by the networking device, and
define a second network operation profile to be selectively implemented by the networking device,
at least one human interface device (HID) prevented from communicating with at least one of the IEDs using a target protocol per the first network operation profile;
a profile selection input configured to be manually asserted by an operator, wherein assertion of the profile selection input causes the networking device to selectively implement the second network operation profile, and wherein the second network operation profile allows the HID to communicate with the at least one IED using the target protocol.

16. The software-defined network of claim 15, wherein the first network operation profile restricts the target protocol, such that the HID is prevented from communicating with the at least one IED.

17. The software-defined network of claim 15, wherein the profile selection input comprises a mechanical spring-wound timer to be manually asserted for a predefined time period during which the HID is allowed to communicate with the IED using the target protocol.

18. The software-defined network of claim 15, wherein the target protocol comprises a Telnet protocol.

* * * * *